June 14, 1960 N. E. ELSAS 2,940,876
METHOD OF AND APPARATUS FOR STARCH COOKING
Filed Nov. 27, 1956
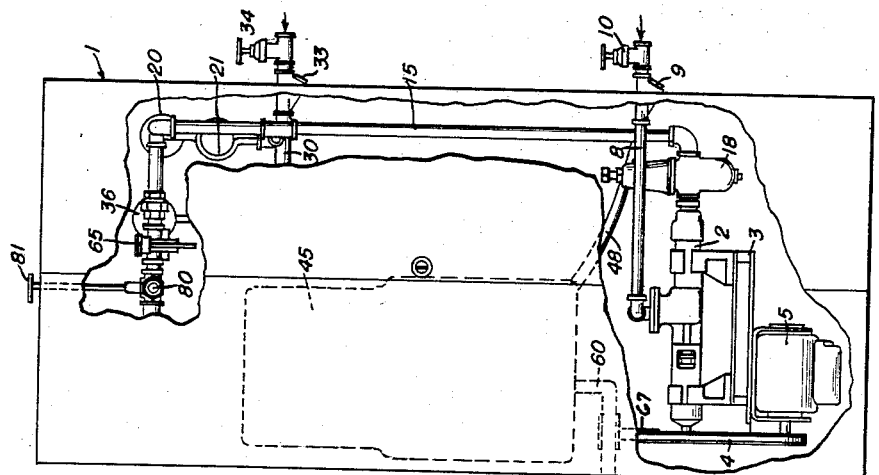
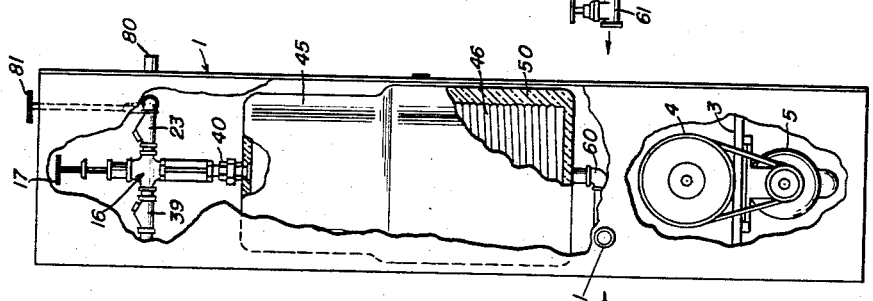
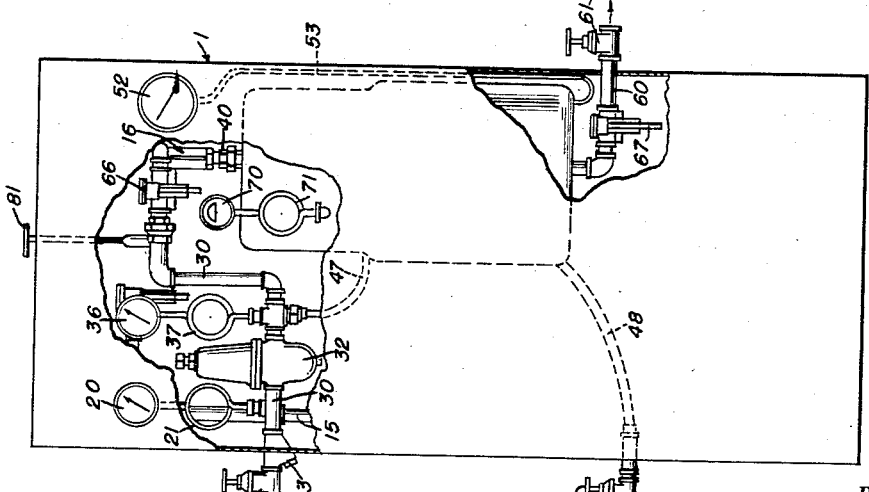
INVENTOR
NORMAN E. ELSAS
BY *Semmes & Semmes*
ATTORNEYS

United States Patent Office 2,940,876
Patented June 14, 1960

2,940,876

METHOD OF AND APPARATUS FOR STARCH COOKING

Norman E. Elsas, 3025 E. Pine Valley Road NW., Atlanta 5, Ga.

Filed Nov. 27, 1956, Ser. No. 624,667

7 Claims. (Cl. 127—28)

The present invention relates to the processing of starch media and more particularly to an improved method of and apparatus for the cooking or gelatinizing of starches.

A primary object of the present invention is to provide apparatus and methods which will permit the gelatinization of a starch slurry in controllable quantities as required to supply varying requirements for the processed starches.

A further object of the present invention is to provide a pressurized form of apparatus which will facilitate starch gelatinization and subsequent delivery of the processed material.

Another object of my invention is to provide a pressurized form of starch gelatinization apparatus which will require reduced residence time for completion of the dissolution of the starch granules.

Another object of my invention is the provision of a pressurized form of starch gelatinization apparatus wherein materials handling is substantially automatic and the amount of feed is correlated to the quantity of cooked starch withdrawn therefrom.

Other objects and advantages of my invention will be readily apparent from the following detailed description of a preferred embodiment thereof taken in connection with the accompanying drawing, wherein:

Figure 1 is a front elevation of a starch gelatinization apparatus constructed in accordance with the present invention, with portions of the outer covering broken away to reveal element placement;

Figure 2 is a side elevation thereof, partly in section, also with portions of the outer housing broken away; and Figure 3 is a rear elevation thereof, also with portions of the outer housing broken away.

Starch in its raw state is a granular material obtained from wheat, potatoes, rice and corn and is insoluble in cold water. At elevated temperatures, these granules swell, dissolve or disperse in water and under proper manipulation will form a smooth paste or solution which gels upon cooling. The gelatinized material may be used in the production of dextrose, adhesives, or in large quantities in the sizing and coating operations incident to textile manufacture. Normally, however, the cooking of starch involves operational difficulties and even with the most careful blending, agitation and temperature control, the gelatinization is not complete and the dispersion will contain agglomerates of raw starch. To break up or to remove these agglomerates is expensive and time consuming, yet to ignore them will occasion problems in subsequent operations.

It has heretofore been proposed to employ a steam injector to move a slurry of raw starch and to accomplish simultaneously its cooking. It has also been proposed to utilize a steam ejector to effect substantially instantaneous cooking of starch granules in aqueous suspension, the cooked material being considered as completely gelatinized.

Briefly stated the present invention contemplates an apparatus for and method of starch gelatinization wherein a slurry of raw starch is combined with steam under pressure in a jet mixer and discharged into a heated reservoir maintained under pressure to insure complete disintegration of the starch granules for dispersion homogenization in a minimum of residence time, and to reduce incipient solidification of the cooked starch prior to its delivery from the apparatus.

Referring to the drawing, apparatus for starch gelatinization conveniently is housed within a cabinet 1 provided with framework adequate to support the component parts of the mechanism. A centrifugal or impeller pump 2 suitably disposed upon a mounting bracket 3 attached to the walls of the cabinet 1 in the base thereof is driven through a suitable belt connection 4 by an electric motor 5 connected to a power source (not shown). A slurry of raw starch from a supply tank (not shown) but disposed adjacent the cabinet 1 is drawn into the pump 2 through a connecting conduit 8 provided with a filter element or strainer 9 and equipped with an emergency control or shut-off valve 10 and is forced through a conduit 15 upwardly and into one side of a jet mixer 16. In the mixer, the starch slurry moves laterally from the side entry port to a central orifice discharging vertically downward, the size of the orifice being controlled by a needle valve manipulated through a hand wheel 17 secured to an outwardly projecting extension of the valve spindle, and in its passage therethrough is converted from a columnar body into an annular film or curtain, the thickness of which may be varied as desired. A pressure regulator 18 disposed in the conduit 15 controls the output of the pump 2 and an indicating gauge 20 mounted upon the exterior of the cabinet 1 for ease of inspection is connected by a line 21 to the conduit 15 and registers the pressure of the raw starch slurry carried by the conduit 15. A check valve 23 is present in the raw starch conduit 15 immediately adjacent the jet mixer 16 to prevent any reverse flow of material through the conduit because of line pressure drops therein.

Steam from a suitable generating source (not shown) is made available to the apparatus through a conduit 30 in which is interposed a pressure regulator 32, a replaceable strainer 33 and a control or shut-off valve 34 and is supplied to the opposite side of the jet mixer 16 where it is admitted through a series of slots disposed in the mixer body below the central orifice to impinge upon the full area of the thin film of starch slurry discharged through said orifice and to combine with the starch slurry. An indicating gauge 36 mounted upon the exterior of the cabinet 1 in close proximity to the gauge 20 is connected by a line 37 to the conduit 30 and registers the regulated pressure of the steam in the conduit 30. A check valve 39 is present in the steam conduit 30 immediately adjacent the jet mixer 16 to prevent any reverse flow of material through the mixer under pressure fluctuations.

The blend of steam and starch slurry discharges through a tail conduit 40 into a pressure storage tank 45, the lower portion of which is surrounded by a heating coil 46 supplied by steam through a feed line 47 which is conveniently connected to the steam conduit 30. Condensate from the heating coil 46 is removed therefrom through a discharge line 48 leading to the exterior of the cabinet 1 and terminating in a control valve 49. To assist in temperature maintenance of the cooked starch, the storage tank is jacketed by a layer 50 of suitable insulation media. The temperature of the contents of the tank 45 is registered upon a suitable indicating gauge 52 mounted upon the exterior of the cabinet 1 and connected by a line 53 to the tank 45.

The cooked starch stored within the tank 45 is discharged therefrom through a conduit 60 leading from the base of the tank to the exterior of the cabinet 1 and having a control valve 61 therein.

In addition to the manual control valves 10, 34 and 61 by means of which operation of the starch cooking apparatus may be regulated as desired, auxiliary solenoid valves 65, 66 and 67 are interposed in the raw starch slurry conduit 15, the steam feed conduit 30 and the discharge line 60 respectively to enable an automatic operation of the apparatus. A pressure switch 70 connected to the tank 45 through a line 71 will function through the customary relays and electrical circuits to open and close the valves 65 and 66 for regulation of material input, the valve 67 remaining closed until proper pressure for homogenization of the cooked starch within the tank 45 has been realized.

Water for back flushing the apparatus and in particular for removing possible accumulations of starch from the jet mixer 16 is supplied through a conduit 80 controlled by a shut off valve 81.

In operation, the pump 2 is started to force raw starch slurry through the conduit 15 under control of the valve 10 and pressure regulator 18, the solenoid valve being open, to the jet mixer 16 and to establish the proper flow of starch through the jet mixer. Thereafter, steam which is known to require a temperature of at least 212° F., is admitted through the conduit 30 under control of the valve 34 and pressure regulator 32, the solenoid valve 66 being open, to enter the opposite side of the jet mixer 16 and to combine with the starch slurry passing therethrough. The raw starch granules when blended with steam in the jet mixer are quickly raised to cooking temperatures and gelatinization thereof is effected together with particle disintegration as the material is being projected from the mixer into the pressure tank 45, the solenoid valve in the discharge conduit thereof being closed. The mixing and blending continues until the predetermined pressure within the tank 45 is reached, thus providing an interval for additional homogenization of the cooked starch whereupon the valve 67 opens to permit discharge of the cooked starch from the tank assuming the valve 61 is open. If there is no immediate demand for the cooked starch and the valve 61 is closed, maintenance of pressure on the tank 45 will cause valves 65 and 66 to close halting material feed to the mixing chamber 16.

Although for normal operation steam at a pressure of 50 p.s.i.g. will be entirely adequate for cooking starch in my apparatus and will enable attainment and maintenance of suitable cooking temperatures, the use of higher pressure steam is also possible. Additionally the feed of steam and raw starch slurry to the jet mixer may be so metered as to produce a cooked starch of any desired consistency to meet the requirements of specialized sizing operations and of course the composition of the raw starch slurry may be varied at will to assist in operational control. Once proper operating conditions have been established the apparatus will function without attention and produce a steady supply of cooked starch of uniform quality assuming there to be no interruption to or change in material supplies. The apparatus will function equally as well under manual control for batch operations, the automatic features in the system serving as an extra safeguard to prevent creation of excessive pressures within the tank 45.

It will at once be obvious that various modifications in the nature of the component elements of my apparatus, their arrangement and operation are possible without departing from the spirit of the invention or the scope of the appended claims.

What is claimed is:

1. Starch cooking apparatus comprising a jet mixer, supply conduits for pressurized steam and raw starch slurry respectively connected to said jet mixer, a pump in said last-named conduit, a pressure maintaining reservoir closed to atmosphere in communication with said jet mixer for receiving the blended steam and starch dispersion discharged from the mixer for subsequent homogenization of the cooked starch, and a valve, responsive to the pressure in said reservoir for controlling the time of residence therein of the cooked starch, to thereby provide an interval of additional homogenization.

2. Starch cooking apparatus comprising a jet mixer, supply conduits for pressurized steam and raw starch slurry respectively connected to said jet mixer, metering means for the input into said jet mixer, a pressure maintaining reservoir closed to atmosphere in communication with said jet mixer for receiving and holding under elevated temperature and pressure the blended steam and starch dispersion discharged from the mixer to permit complete homogenization of the cooked starch, and a valve, responsive to the pressure in said reservoir for controlling the time of residence therein of the cooked starch, to thereby provide an interval of additional homogenization.

3. Starch cooking apparatus comprising a jet mixer, supply conduits for pressurized steam and raw starch slurry respectively connected to said jet mixer, pressure regulators for metering the input into said jet mixer, a pressure maintaining reservoir closed to atmosphere in communication with said jet mixer for receiving and holding under elevated temperature and pressure the blended steam and starch dispersion discharged from the mixer to permit complete homogenization of the cooked starch, and pressure regulable means responsive to reservoir pressures to balance input to and product discharge from the apparatus.

4. Starch cooking apparatus comprising a jet mixer, a conduit for raw starch slurry connected to said mixer, a pump for forcing slurry through said conduit, means associated with said mixer for converting an annular column of slurry fed through said conduit, into an annular flowing film, a second conduit for pressurized steam connected to said mixer and directed to impinge a body of pressurized steam upon said film of slurry, a pressure maintaining reservoir closed to atmosphere, in communication with said jet mixer for receiving the blended steam and starch dispersion discharged from the mixer for subsequent homogenization of the cooked starch, and a valve, responsive to the pressure in said reservoir for controlling the time of residence therein of the cooked starch, to thereby provide an interval of additional homogenization.

5. Apparatus as claimed in claim 4, including means for regulating the thickness of said film of slurry.

6. A method of cooking starch which comprises projecting a pressurized slurry of raw starch in jet form, impacting said jet flow with pressurized steam for substantially instantaneous thermal disintegration of the suspended starch particles within said slurry, holding the blended steam and starch dispersion under a temperature of at least 212° F. and pressure of at least 50 p.s.i.g. to complete homogenization of said dispersion, and balancing the input of slurry and steam and the discharge of homogenized product, through control of the pressure maintained in said last-named step.

7. A method of cooking starch which comprises projecting a pressurized slurry of raw starch in jet form, impacting said jet flow with a metered quantity of steam for substantially instaneous thermal disintegration of the suspended starch particles within said slurry, holding the blended steam and starch dispersion of regulated consistency under a temperature of at least 212° F. and pressure of at least 50 p.s.i.g. to complete homogenization of said dispersion, and balancing the input of slurry and steam and the discharge of homogenized product, through control of the pressure maintained in said last-named step.

References Cited in the file of this patent

UNITED STATES PATENTS

| | | |
|---|---|---|
| 2,202,573 | Coppock | May 28, 1940 |
| 2,253,262 | Bierly | Aug. 19, 1941 |
| 2,481,436 | Miller | Sept. 6, 1947 |
| 2,582,198 | Etheridge | Jan. 8, 1952 |
| 2,633,436 | Martin | Mar. 31, 1953 |
| 2,805,966 | Etheridge | Sept. 10, 1957 |

OTHER REFERENCES

Paper Trade Journal, Art. by Etheridge, November 5, 1954, pp. 16–18.